United States Patent
Huang-Fu et al.

(10) Patent No.: US 10,264,449 B2
(45) Date of Patent: Apr. 16, 2019

(54) METHOD OF SIM-LESS SUBSCRIPTION MECHANISM FOR MOBILE CELLULAR NETWORKS

(71) Applicant: MEDIATEK INC., Hsinchu (TW)

(72) Inventors: Chien-Chun Huang-Fu, Hsinchu (TW); I-Kang Fu, Taipei (TW)

(73) Assignee: HFI Innovation INC., Hsin-Chu (TW)

( * ) Notice: Subject to any disclaimer, the term of this patent is extended or adjusted under 35 U.S.C. 154(b) by 0 days.

(21) Appl. No.: 15/296,034

(22) Filed: Oct. 18, 2016

(65) Prior Publication Data

US 2017/0111752 A1    Apr. 20, 2017

Related U.S. Application Data

(60) Provisional application No. 62/243,213, filed on Oct. 19, 2015.

(51) Int. Cl.
*H04W 4/00* (2018.01)
*H04W 12/06* (2009.01)
*H04W 8/20* (2009.01)
*H04W 4/50* (2018.01)
*H04W 4/70* (2018.01)
*H04W 4/80* (2018.01)

(52) U.S. Cl.
CPC ............ *H04W 12/06* (2013.01); *H04W 4/50* (2018.02); *H04W 8/205* (2013.01); *H04W 4/70* (2018.02); *H04W 4/80* (2018.02)

(58) Field of Classification Search
CPC . H04W 4/001; H04L 63/0428; H04L 713/156
See application file for complete search history.

(56) References Cited

U.S. PATENT DOCUMENTS

| | | | | |
|---|---|---|---|---|
| 7,890,371 | B2* | 2/2011 | Chao | G06Q 20/105 235/384 |
| 2008/0306828 | A1* | 12/2008 | Chao | G06Q 20/105 705/17 |
| 2016/0149903 | A1* | 5/2016 | Suh | H04L 63/0428 713/156 |
| 2017/0111752 | A1* | 4/2017 | Huang-Fu | H04W 12/06 |
| 2018/0212698 | A1* | 7/2018 | Sun | H04L 5/0053 |

* cited by examiner

*Primary Examiner* — William D Cumming
(74) *Attorney, Agent, or Firm* — Imperium Patent Works; Zheng Jin (57) ABSTRACT

Apparatus and methods are provided for sim-less subscription mechanism for mobile cellular networks. In novel aspect, the mobile device supporting the e-SIM is provisioned with the assistance the UE by obtaining subscription information from the UE. In one embodiment, UE retrieves an ID from the mobile device. The UE sends a subscription request to the e-SIM platform, wherein the subscription request includes information of the retrieved ID of the mobile device and the subscription information of the UE. In another embodiment, the mobile device retrieves subscription information from the UE. The mobile device sends a subscription request to the e-SIM platform, wherein the subscription request includes information of the subscription information retrieved from the UE and the ID of the mobile device. The mobile device receives a subscription response from the e-SIM platform and enables the mobile device through mobile device's e-SIM based on the subscription response.

20 Claims, 6 Drawing Sheets

METHOD OF SIM-LESS SUBSCRIPTION MECHANISM FOR MOBILE CELLULAR NETWORKS

CROSS REFERENCE TO RELATED APPLICATIONS

This application claims priority under 35 U.S.C. § 119 U.S. provisional application 62/243,213 entitled "METHOD OF SIM-LESS SUBSCRIPTION MECHANISM FOR MOBILE CELLULAR NETWORKS" filed on Oct. 19, 2015, the subject matter of which is incorporated herein by reference.

TECHNICAL FIELD

The disclosed embodiments relate generally to wireless communication, and, more particularly, to methods and apparatus for sim-less subscription mechanism for mobile cellular networks.

BACKGROUND

Mobile networks are being used to connect all sorts of devices, such as wireless-enabled printers, cameras and other peripherals, automated reading of utility meters, intelligent connectivity of cars and commercial vehicles to enable drivers to access navigation, infotainment or breakdown services, traffic lights, home security and assisted living. The number of mobile connected devices is expected grow exponentially, resulting in a huge new market opportunity, predominantly in the machine-to-machine (M2M) and consumer electronics sectors. All parties in the M2M ecosystem will struggle if we remain solely dependent upon the traditional SIM card because changing SIM cards is problematic for being only associated with one network operator. The sim-less technology, also known as the electronic sim (e-SIM) solves the problem by providing a global product with local provisioning. It also solves the challenge of managing those devices in the field when many M2M devices are remotely located, often hermetically sealed, their after sale location is not known during production and furthermore their product life cycles are lengthy. Many of the interfaces and processes needed to make the remote provisioning of SIMs work are virtually identical to current SIM personalization processes and interfaces used by mobile operators today.

For mobile devices with e-SIM functionality, the subscriptions context could be provisioned over the air (OTA). In the existing implementations, the user could install the subscription context onto the mobile device by selecting the preferred plan via user interfaces, such as the web page or mobile applications. Alternatively, the e-SIM can be enabled by automatic selection by the e-SIM platform where the mobile device connects at the first boot. However, the existing mechanism always enables the e-SIM through SIM vendor's server. The user cannot easily choose their preferred operator.

Improvements and enhancements are required for sim-less subscription mechanism for mobile cellular networks, such that the user may have the right to choose their preferred vendor.

SUMMARY

Apparatus and methods are provided for sim-less subscription mechanism for mobile cellular networks. In novel aspect, the mobile device supporting the e-SIM is provisioned with the assistance the UE by obtaining subscription information from the UE. In one embodiment, UE retrieves an ID from the mobile device. The UE sends a subscription request to an e-SIM platform, wherein the subscription request includes information of the retrieved ID of the mobile device, and wherein the subscription request triggers a subscription response from the e-SIM platform, and wherein the subscription response includes remote provisioning information of the subscription context for the mobile device to enable the mobile device through e-SIM. In another embodiment, the mobile device retrieves subscription information from the UE. The mobile device sends a subscription request to an e-SIM platform, wherein the subscription request includes information of the subscription information retrieved from the UE. The mobile device receives a subscription response from the e-SIM platform, and wherein the subscription response includes remote provisioning information of the subscription context. The mobile device subsequently enables the mobile device through mobile device's e-SIM based on the subscription response.

In one embodiment, the triggers of the sending the subscription request include detecting at either the mobile device or the UE one or more events including a pressing a button on the UE, receiving a broadcast from the mobile device, receiving a signaling from the mobile device, and a notification from one or more sensors. In another embodiment, the subscription request message includes the mobile device ID. The mobile device ID is at least one of user identifications of the mobile device comprising: an IMEI, and an eUICC ID. In one embodiment, the subscription request message further includes one or more elements including an ID of an existing subscription, one or more keys for encryption, and one or more subscription configuration parameters.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
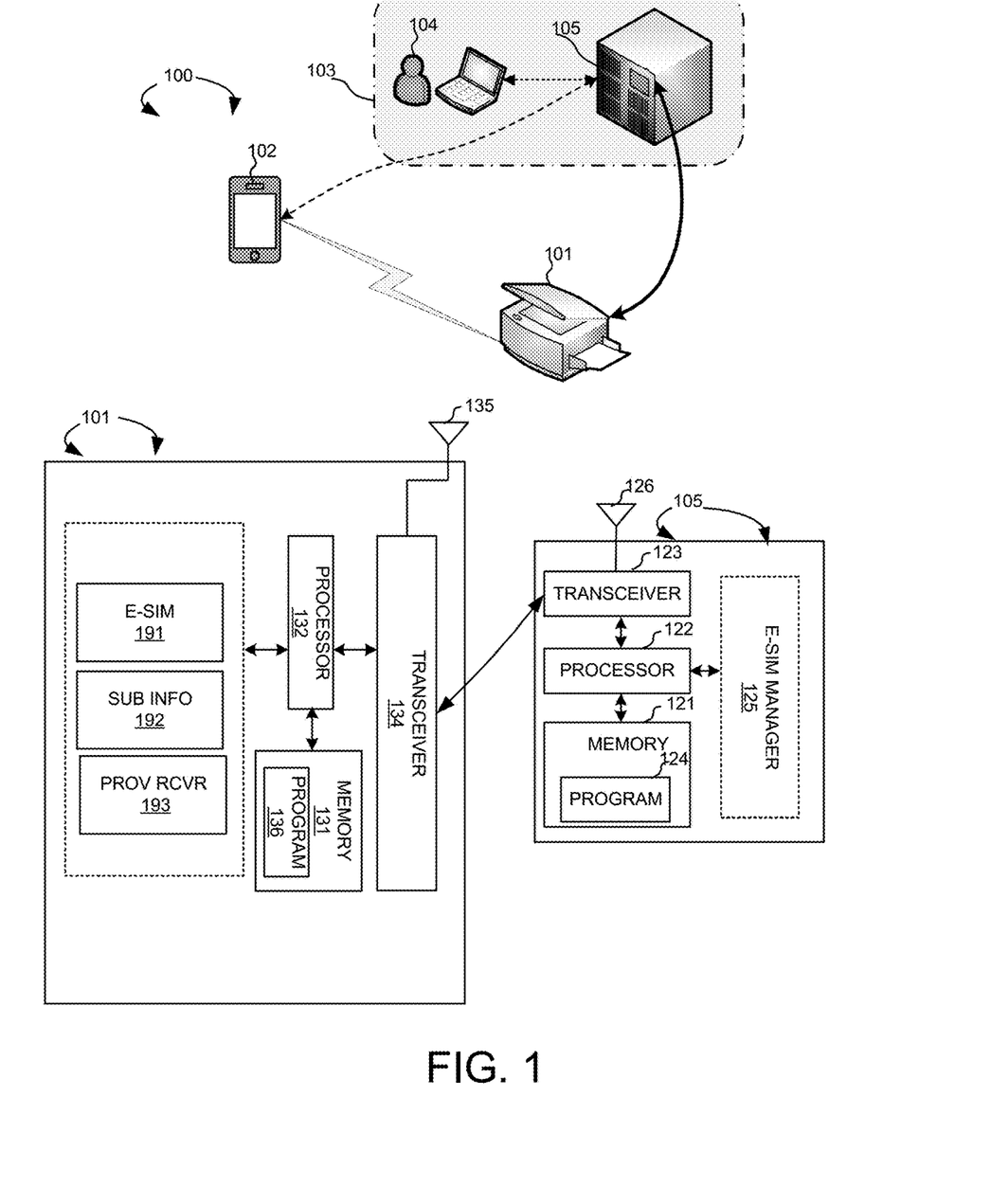
FIG. 1 illustrates a system diagram of a wireless network 100 with an e-SIM enabled wireless device and a user equipment (UE).

FIG. 1 illustrates a system diagram of a wireless network 100 with an e-SIM enabled wireless device and a user equipment (UE). Wireless network 100 includes a mobile device 101, which supports the e-SIM. A UE 102 connects with wireless network 100 and contains its subscription information associates with wireless network 100. An e-SIM platform 103 includes a SIM provider 104 and a provisioning server 105. Mobile device 101 can communicate with e-SIM platform 103 via either mobile network, such as a 3G/4G cellular network, or IP network, such as a WiFi network. Mobile device 101 also communicates with UE 102 via one communication path, such as a WiFi link, a Bluetooth® communication connection, a NFC communication, or a scanning of a bar code. Further, UE 102 can communicate with the e-SIM platform 103 via either an IP connection, such as a WiFi IP connection, a WiMax IP connection, and an Ethernet IP connection, or a cellular network, such as a mobile cellular network IP connection and a mobile cellular network short message service (SMS) connection. Provisioning server 105 can be a logical entity, which can be implemented with other network logical entities. In one embodiment, mobile device 101 connects to wireless network 101 using an existing subscription context within a physical SIM card or a subscription element. In another embodiment, mobile device 101 connects to wireless network 101 using an existing subscription context from a second user device, such UE 102, through remote SIM access profile (rSAP).

In one novel aspect, mobile device 101 is provisioned with the assistance of UE 102 by obtaining subscription information from UE 102. In one embodiment, UE 102 obtains identification (ID) information of mobile device 101 and sends subscription request to e-SIM platform 103. In another embodiment, mobile device 101 obtains subscription information from UE 102 and sends subscription request to e-SIM platform 103. The triggers of the sending the subscription request include detecting at either the mobile device or the UE one or more events including a pressing a button on the UE, receiving a broadcast from the mobile device, receiving a signaling from the mobile device, and a notification from one or more sensors.

In one embodiment, provisioning server 105 has an address assigned according to the ID of existing subscription contexts. In another embodiment, the address of provisioning server 105 can be predefined in the user device or the subscription element. In yet another embodiment, the address of provisioning server 105 can be user configured.

FIG. 1 further shows simplified block diagrams of mobile device 101 and e-SIM platform 103 in accordance with the current invention. Mobile device 101 has an antenna 135, which transmits and receives radio signals. A RF transceiver module 134, coupled with the antenna, receives RF signals from antenna 135, converts them to baseband signals and sends them to processor 132. RF transceiver 134 also converts received baseband signals from processor 132, converts them to RF signals, and sends out to antenna 135. Processor 132 processes the received baseband signals and invokes different functional modules to perform features in mobile device 101. Memory 131 stores program instructions and data 136 to control the operations of mobile device 101. Mobile device 101 also includes a set of control modules such as an e-SIM 191, a subscription information circuit 192, and a provisioning receiver 193. E-SIM 191 manages subscription context for the mobile device. Subscription information circuit 193 communicates subscription information through an assistance of a user equipment (UE) to an e-SIM platform, wherein the UE contains subscription information for the mobile device to communicate with the e-SIM platform. Provisioning receiver 193 retrieves remote provisioning information of subscription context and enables the mobile device based on the provisioning information.

E-SIM platform 103 has an antenna 126, which transmits and receives radio signals. A RF transceiver module 123, coupled with the antenna, receives RF signals from antenna 126, converts them to baseband signals and sends them to processor 122. RF transceiver 123 also converts received baseband signals from processor 122, converts them to RF signals, and sends out to antenna 126. Processor 122 processes the received baseband signals and invokes different functional modules to perform features in e-SIM platform 103. Memory 121 stores program instructions and data 124 to control the operations of e-SIM platform 103.

The sim-less/e-SIM technology can be initiated through SIM vendor's server. The SIM-less technology includes GSMA eUICC, the security element (SE) solution, the trusted execution environment (TEE) based solution. In one novel aspect, a sim-less subscription method allows the user and/or the operator to have more control right during the subscription process. It allows the user to engage directly with the operator for service subscription. It also automates the subscription procedure and enables combining the new subscription with the existing subscription during the process. In one embodiment, the mobile device supporting the e-SIM sends its device ID to an UE. The UE subsequently sends the subscription request message including the ID of the mobile device and subscription information of the UE to the e-SIM platform. In another embodiment, the mobile device obtains the subscription information from the UE and sends the subscription request message containing the ID of the mobile device and the subscription information of the UE to the e-SIM platform. The process can be initiated by predefined triggering events, including a pressing a button on the mobile device, a pressing a button on the UE, receiving a broadcast from the mobile device, receiving a signaling from the mobile device, and a notification from one or more sensors.

Figure 2:
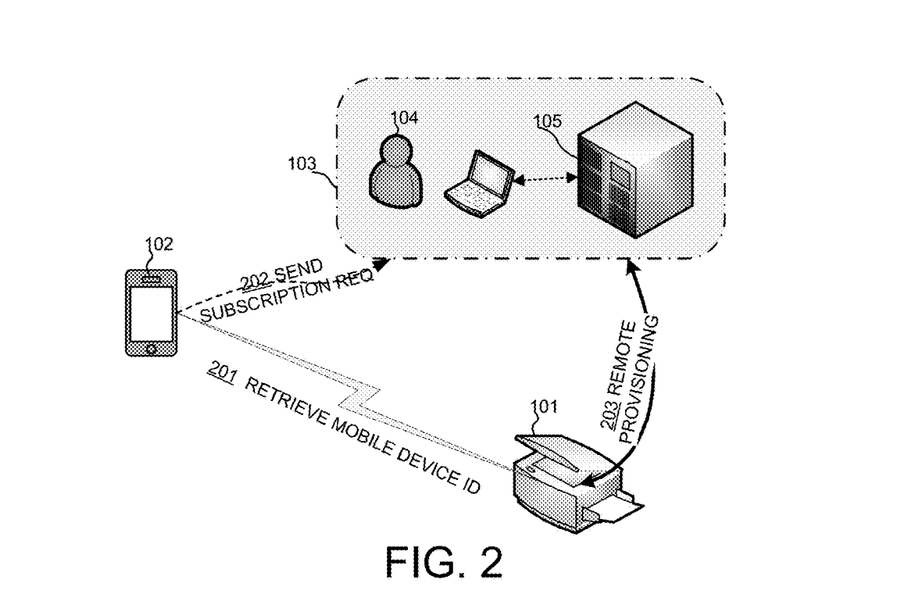
FIG. 2 illustrates an exemplary diagram of the UE sending the subscription request to the e-SIM platform with the retrieved ID of the mobile device in accordance with embodiments of the current invention.

FIG. 2 illustrates an exemplary diagram of the UE sending the subscription request to the e-SIM platform with the retrieved ID of the mobile device in accordance with embodiments of the current invention. Mobile device 101 supports e-SIM. UE 102 contains subscription information, which enables the mobile device to connect to the network. E-SIM platform 103 provides provisioning services to mobile devices. In one embodiment, UE 102 sends subscription request to e-SIM platform 103. At step 201, UE 102 detects one or more triggering events and retrieves ID of mobile device 101. The triggering events include a pressing a button on the mobile device, a pressing a button on the UE, receiving a broadcast from the mobile device, receiving a signaling from the mobile device, and a notification from one or more sensors. The ID of mobile device 101 can be a eUICC ID of mobile device 101 or the international mobile equipment identification (IMEI) of mobile device 101. In one embodiment, UE 102 obtains the ID of mobile device 101 through a preconfigured communication channel. The communication channel can be selected from the group including a WiFi IP connection, a WiMAX IP connection, an Ethernet IP connection, a mobile cellular network IP connection, a mobile cellular network SMS connection. Upon receiving the ID of mobile device 101, UE 102 builds subscription request based on the retrieved ID of mobile device 101. At step 202, UE 102 sends the subscription request to e-SIM platform 103. The subscription request message includes at least the ID of mobile device 101. In other embodiments, the subscription request message may include one or more elements including an ID of an existing subscription, one or more keys for encryption, and one or more subscription configuration parameters.

Upon receiving the ID of mobile device 101 and subscription information of UE 102 in the subscription request, e-SIM platform would be able to configure mobile device 101 for the e-SIM based on the subscription request message containing the mobile device ID and the subscription information of UE 102. In one embodiment, e-SIM platform 103 may refer mobile device 101 or UE 102 to another provisioning server/subscription management server. In another embodiment, the provisioning server may associate the existing subscription, which is assigned in the subscription request, with the newly assigned subscription.

In one embodiment, the provisioning information is sent to mobile device 101 directly at step 203. In another embodiment, the provisioning information is relayed to mobile device 101 through UE 102. In the relay configuration, e-SIM platform 103 sends subscription response to UE 102. UE 102 relays the information mobile device 101. In yet another embodiment, e-SIM platform sends the subscription response to a third party, which relays the subscription response to mobile device 101. Upon receiving the subscription response, mobile device 101 is able to connect to the network by applying the provisioned subscription context.

Figure 3:
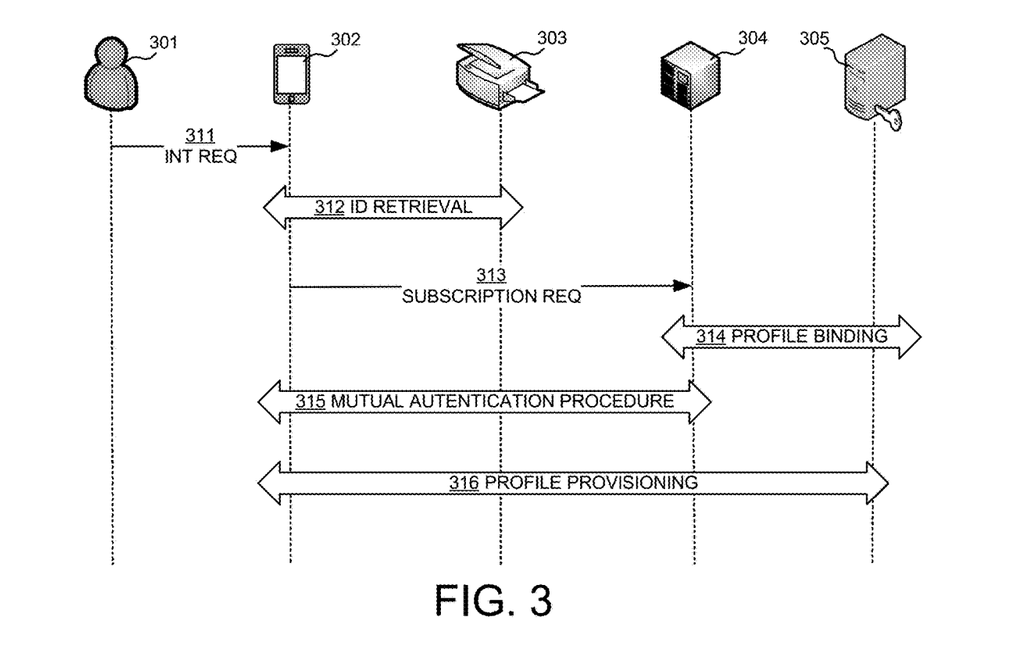
FIG. 3 illustrates an exemplary flow chart of the UE sending the subscription request to the e-SIM platform initiated by a trigger detected at the UE in accordance with embodiments of the current invention.

FIG. 3 illustrates an exemplary flow chart of the UE sending the subscription request to the e-SIM platform, initiated by a trigger detected at the UE in accordance with embodiments of the current invention. A user 301 can initiates a subscription process. A UE 302 contains subscription information, which enables the device to connect to the network. A mobile device 303 supports e-SIM. An E-SIM platform 304 provides provisioning services to mobile devices. A security server 305 provides authentication services to subscribers. At step 311, user 301 sends an initiation request to UE 302. The initiation request can be in the form of a pressing a button on the UE, receiving a broadcast from the mobile device, receiving a signaling from the mobile device, and a notification from one or more sensors. Upon detecting the initiation request, at step 313, UE 302 starts the process to retrieve the ID of mobile device 303. The ID retrieval process can be done through one of the communication channels include a WiFi connection, a Bluetooth® communication connection, an NFC communication, and a scanning of a bar code or a QR code. The ID of mobile device 303 can be an eUICC ID or an IMEI or other forms of identification of mobile device 303. At step 313, UE 302 sends the subscription request to e-SIM platform 304. The subscription request includes the ID of mobile device 303. At step 314, upon receiving the subscription request, provisioning server 304 starts profile binding with security server 305. At step 315, the provisioning server starts mutual authentication procedure with either UE 302 or mobile device 303 or both. At step 316, the network performs profile provisioning for mobile device 303.

Figure 4:
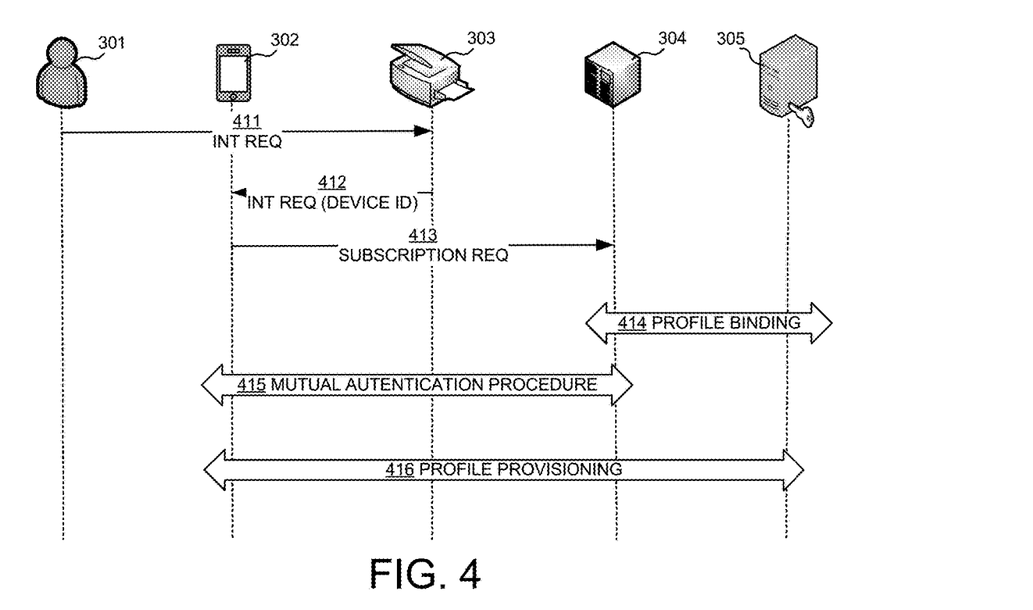
FIG. 4 illustrates an exemplary flow chart of the UE sending the subscription request to the e-SIM platform initiated by a trigger detected at the mobile device in accordance with embodiments of the current invention.

FIG. 4 illustrates an exemplary flow chart of the UE sending the subscription request to the e-SIM platform initiated by a trigger detected at the mobile device in accordance with embodiments of the current invention. A user 301 can initiates a subscription process. A UE 302 contains subscription information, which enables the device to connect to the network. A mobile device 303 supports e-SIM. An E-SIM platform 304 provides provisioning services to mobile devices. A security server 305 provides authentication services to subscribers. At step 411, user 301 sends initiation request to mobile device 303. At step 412, mobile device 303 sends an install request to UE 302, which includes the ID mobile device 303. In one embodiment, the ID of mobile device 303 can be the eUICC ID or IMEI of mobile device 303. At step 413, UE 302 sends the subscription request to e-SIM platform 304. The subscription request includes the ID of mobile device 303 and subscription information of UE 302. In one embodiment, the subscription request further includes one or more elements including an ID of an existing subscription, one or more keys for encryption, and one or more subscription configuration parameters. At step 414, upon receiving the subscription request, provisioning server 304 starts profile binding with security server 305. At step 415, the provisioning server starts mutual authentication procedure with either UE 302 or mobile device 303 or both. At step 416, the network performs profile provisioning for mobile device 303.

Figure 5:
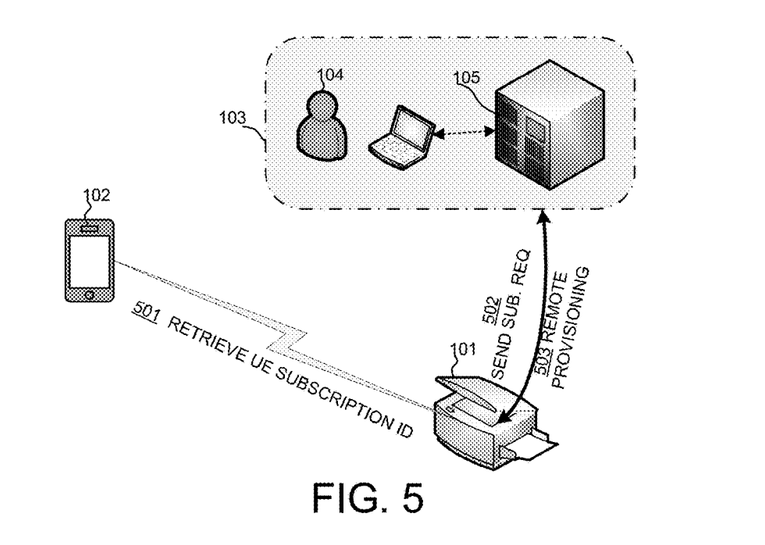
FIG. 5 illustrates an exemplary diagram of the mobile device sending the subscription request to the e-SIM platform with the retrieved subscription information of the UE in accordance with embodiments of the current invention.

FIG. 5 illustrates an exemplary diagram of the mobile device sending the subscription request to the e-SIM platform with the retrieved subscription information of the UE in accordance with embodiments of the current invention. Mobile device 101 supports e-SIM. UE 102 contains subscription information, which enables the device to connect to the network. E-SIM platform 103 provides provisioning services to mobile devices. In one embodiment, the mobile device obtains subscription information from the UE and sends the subscription request to the e-SIM platform. At step 501, mobile device 101 retrieves UE subscription ID from UE 102. The UE subscription ID can be international mobile subscription ID (IMSI), Globally Unique Temporary UE Identity (GUTI), temporary mobile subscription ID (TMSI), Mobile Station International Subscriber Directory Number (MSISDN), or other UE subscription ID. The trigger of the retrieval process can be one or more events including a pressing a button on the mobile device, a pressing a button on the UE, receiving a broadcast from the mobile device, receiving a signaling from the mobile device, and a notification from one or more sensors. At step 502, mobile device 101 sends subscription request to e-SIM platform 103 based on the retrieved subscription information from UE 102. At step 503, e-SIM platform 104 performs remote provisioning for mobile device 101. Mobile device 101 provisions its e-SIM accordingly and accesses the network applying the subscription context.

Figure 6:
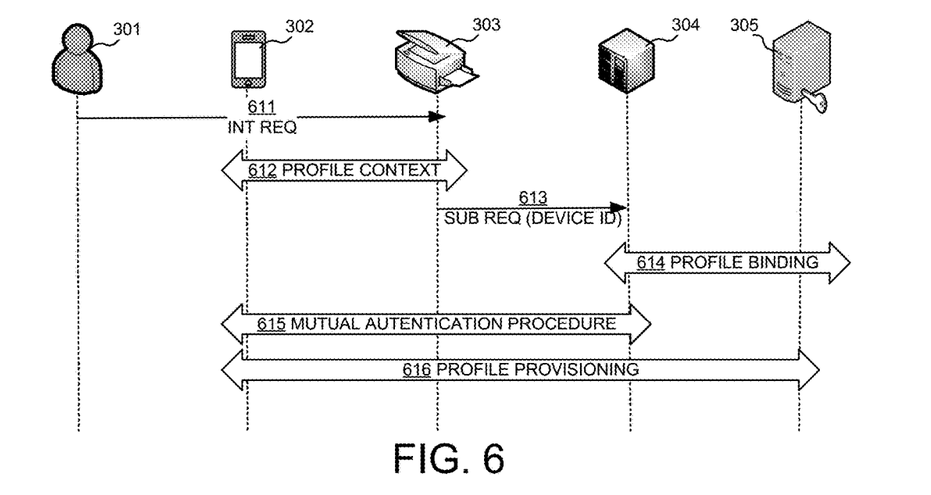
FIG. 6 illustrates an exemplary flow chart of the mobile device sending the subscription request to the e-SIM platform initiated by a trigger detected at the UE in accordance with embodiments of the current invention.

FIG. 6 illustrates an exemplary flow chart of the mobile device sending the subscription request to the e-SIM platform initiated by a trigger detected at the UE in accordance with embodiments of the current invention. A user 301 can initiates a subscription process. A UE 302 contains subscription information, which enables the device to connect to the network. A mobile device 303 supports e-SIM. An E-SIM platform 304 provides provisioning services to mobile devices. A security server 305 provides authentication services to subscribers. At step 611, user 301 initiates an install request to mobile device 303. At step 612, mobile device 303 establishes a connection to the UE which shares the profile context in the (U)SIM for the mobile device 303 to attach to the cellular network. At step 613, mobile device 303 sends subscription request to e-SIM platform 304 with its ID and the retrieved subscription information. At step 614, upon receiving the subscription request, provisioning server 304 starts profile binding with security server 305. At step 615, the provisioning server starts mutual authentication procedure with either UE 302 or mobile device 303 or both. At step 616, the network performs profile provisioning for mobile device 303.

Figure 7:
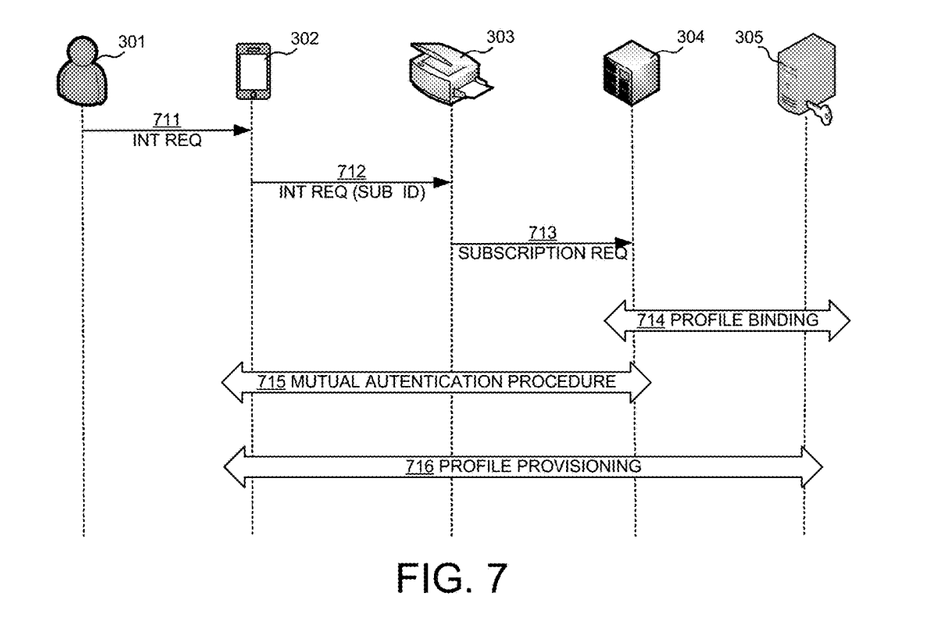
FIG. 7 illustrates an exemplary flow chart of the mobile device sending the subscription request to the e-SIM platform initiated by a trigger detected at the mobile device in accordance with embodiments of the current invention.

FIG. 7 illustrates an exemplary flow chart of the mobile device sending the subscription request to the e-SIM platform initiated by a trigger detected at the mobile device in accordance with embodiments of the current invention. A user 301 can initiates a subscription process. A UE 302 contains subscription information, which enables the device to connect to the network. A mobile device 303 supports e-SIM. An E-SIM platform 304 provides provisioning services to mobile devices. A security server 305 provides authentication services to subscribers. At step 711, user 301 initiates an install request to UE 302. At step 712, UE 302 sends install request to mobile device 303 with its subscription information. At step 713, mobile device 303 sends subscription request to e-SIM platform 304 with its own ID and the subscription information of UE 302. At step 714, upon receiving the subscription request, provisioning server 304 starts profile binding with security server 305. At step 715, the provisioning server starts mutual authentication procedure with either UE 302 or mobile device 303 or both. At step 716, the network performs profile provisioning for mobile device 303.

Figure 8:
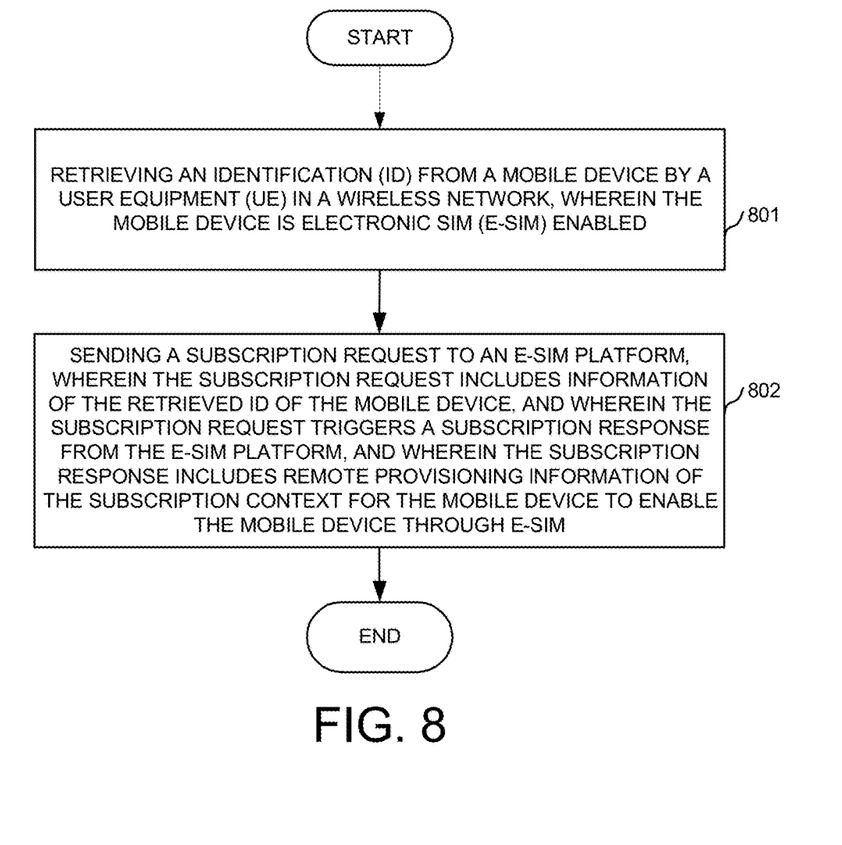
FIG. 8 illustrates an exemplary flow chart of a UE sending a subscription request to an e-SIM platform in accordance with embodiments of the current invention.

FIG. 8 illustrates an exemplary flow chart of a UE sending a subscription request to an e-SIM platform in accordance with embodiments of the current invention. At step 801, the UE retrieves an identification (ID) from a mobile device in a wireless network, wherein the mobile device is electronic SIM (e-SIM) enabled. At step 802, the UE sends a subscription request to an e-SIM platform, wherein the subscription request includes information of the retrieved ID of the mobile device, and wherein the subscription request triggers a subscription response from the e-SIM platform, and wherein the subscription response includes remote provisioning information of the subscription context for the mobile device to enable the mobile device through e-SIM.

Figure 9:
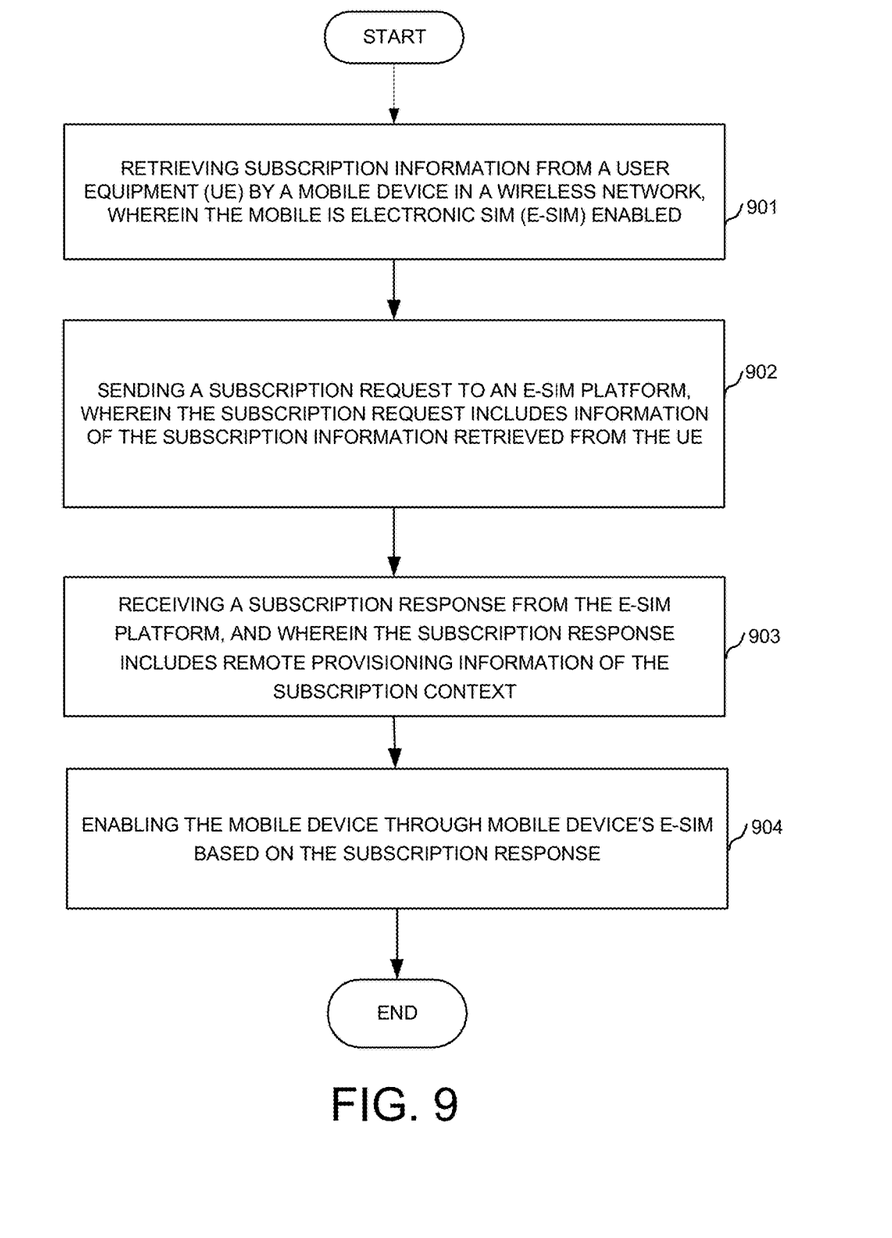
FIG. 9 illustrates an exemplary flow chart of a mobile device sending a subscription request to an e-SIM platform in accordance with embodiments of the current invention.

FIG. 9 illustrates an exemplary flow chart of a mobile device sending a subscription request to an e-SIM platform in accordance with embodiments of the current invention. At step 901, the mobile device retrieves subscription information from a user equipment (UE) in a wireless network, wherein the mobile is electronic SIM (e-SIM) enabled. At step 902, the mobile device sends a subscription request to an e-SIM platform, wherein the subscription request includes information of the subscription information retrieved from the UE. At step 903, the mobile device receives a subscription response from the e-SIM platform, and wherein the subscription response includes remote provisioning information of the subscription context. At step 904, the mobile device enables the mobile device through mobile device's e-SIM based on the subscription response.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
retrieving an identification (ID) from a remote mobile device by a user equipment (UE) in a wireless network, wherein the mobile device is electronic SIM (e-SIM) enabled, and wherein the retrieved ID is at least one of the identifications comprising: an user ID, an identification of the mobile device, and an e-SIM of the mobile device;
sending a subscription request to a remote e-SIM platform by the UE, wherein the subscription request includes information of the retrieved ID of the remote mobile device, and wherein the subscription request triggers a subscription response from the e-SIM platform, and wherein the subscription response from the e-SIM platform further includes remote provisioning information of the subscription context destined to the mobile device to enable the mobile device through e-SIM.

2. The method of claim 1, further comprising:
receiving the subscription response from the e-SIM platform; and
relaying the received subscription response to the mobile device.

3. The method of claim 1, wherein the subscription request message includes the retrieved ID, and wherein the retrieved ID is at least one of user identifications of the mobile device comprising: an international mobile equipment identification (IMEI), and an electronic universal integrated circuit identification (eUICCU) ID.

4. The method of claim 3, wherein the subscription request message further includes one or more elements comprising: an ID of an existing subscription, one or more keys for encryption, and one or more subscription configuration parameters.

5. The method of claim 1, wherein the retrieving the ID from the mobile device is triggered by one or more events comprising: a pressing a button on the mobile device, a pressing a button on the UE, receiving a broadcast from the mobile device, receiving a signaling from the mobile device, and a notification from one or more sensors.

6. The method of claim 1, wherein the sending of the subscription request uses one of preconfigured channels comprising: a WiFi IP connection, a WiMAX IP connection, an Ethernet IP connection, a mobile cellular network IP connection, a mobile cellular network short message service (SMS) connection.

7. The method of claim 1, wherein the retrieving of the ID uses one of the preconfigured paths comprising: a WiFi connection, a Bluetooth® communication connection, a near field communication (NFC), and a scanning of a bar code.

8. A method, comprising:
retrieving subscription information from a remote user equipment (UE) by a mobile device in a wireless network, wherein the mobile device is electronic SIM (e-SIM) enabled;
sending a subscription request to a remote e-SIM platform, wherein the subscription request includes information of the subscription information retrieved from the UE;

receiving a subscription response from the e-SIM platform by the mobile device, and wherein the subscription response includes remote provisioning information of the subscription context, wherein the remote provisioning information is at least based on information of the subscription information retrieved from the UE; and enabling the mobile device through mobile device's e-SIM based on the subscription response.

9. The method of claim 8, wherein the subscription request message includes an identification (ID) of the mobile device and retrieved subscription information, and wherein the mobile device ID is at least one of user identifications of the mobile device comprising: an international mobile equipment identification (IMEI), and an electronic universal integrated circuit identification (eUICCU) ID.

10. The method of claim 9, wherein the subscription request message further includes one or more elements comprising: an ID of an existing subscription, one or more keys for encryption, and one or more subscription configuration parameters.

11. The method of claim 8, wherein the retrieving subscription information from the UE is triggered by one or more events comprising: a pressing a button on the mobile device, a pressing a button on the UE, receiving a broadcast from the mobile device, receiving a signaling from the mobile device, and a notification from one or more sensors.

12. The method of claim 8, wherein the sending of the subscription request uses one of preconfigured channels comprising: a WiFi IP connection, a WiMAX IP connection, an Ethernet IP connection, a mobile cellular network IP connection, a mobile cellular network short message service (SMS) connection.

13. The method of claim 8, wherein the retrieving of subscription information uses one of the preconfigured paths comprising: a WiFi connection, a Bluetooth® communication connection, a near field communication (NFC), and a scanning of a bar code.

14. A mobile device, comprising:
a radio frequency (RF) transceiver that transmits and receives radio signals in a wireless communication network;
an electronic SIM (e-SIM) that manages subscription context for the mobile device;
a subscription information circuit that sends an ID of the mobile device to a user equipment (UE) and communicates subscription information through an assistance of the UE to an e-SIM platform, wherein the UE contains subscription information for the mobile device to communicate with the e-SIM platform; and
a provisioning receiver that retrieves remote provisioning information of subscription context and enables the mobile device based on the provisioning information, wherein the remote provisioning information is at least based on information of the subscription information retrieved from the UE.

15. The mobile device of claim 14, wherein the subscription information circuit retrieves subscription information from the UE and sends a subscription request to the e-SIM platform, and wherein the subscription request message includes a mobile device ID and retrieved subscription information.

16. The mobile device of claim 15, wherein the subscription request message includes an identification (ID) of the mobile device and retrieved subscription information, and wherein the mobile device ID is at least one of user identifications of the mobile device comprising: an international mobile equipment identification (IMEI), and an electronic universal integrated circuit identification (eUICCU) ID.

17. The mobile device of claim 16, wherein the subscription request message further includes one or more elements comprising: an ID of an existing subscription, one or more keys for encryption, and one or more subscription configuration parameters.

18. The mobile device of claim 15, wherein the retrieving the ID from the UE is triggered by one or more events comprising: a pressing a button on the mobile device, a pressing a button on the UE, receiving a broadcast from the mobile device, receiving a signaling from the mobile device, and a notification from one or more sensors.

19. The mobile device of claim 15, wherein the sending of the subscription request uses one of preconfigured channels comprising: a WiFi IP connection, a WiMAX IP connection, an Ethernet IP connection, a mobile cellular network IP connection, a mobile cellular network short message service (SMS) connection.

20. The mobile device of claim 16, wherein the retrieving of subscription information uses one of the preconfigured paths comprising: a WiFi connection, a Bluetooth® communication connection, a near field communication (NFC), and a scanning of a bar code.

* * * * *